United States Patent [19]

Lestak et al.

[11] 4,182,379
[45] Jan. 8, 1980

[54] LOW CONDUCTING METAL SCREEN SUPPORT FLANGE

[75] Inventors: Robert G. Lestak, Agoura; Allison L. Christensen, Lake View Terrace, both of Calif.

[73] Assignee: SSP Products, Inc., Burbank, Calif.

[21] Appl. No.: 912,432

[22] Filed: Jun. 5, 1978

[51] Int. Cl.² ............................................. F16L 9/14
[52] U.S. Cl. ................................. 138/149; 138/109; 138/148; 138/123; 165/185
[58] Field of Search ............... 138/109, 149, 113, 114, 138/148, 123; 55/522, 525, 529, 267; 285/47, 138; 165/185

[56] References Cited

U.S. PATENT DOCUMENTS

| | | | |
|---|---|---|---|
| 2,133,376 | 10/1938 | Brown | 138/149 X |
| 2,510,825 | 6/1950 | Lechtenberg | 138/149 X |
| 2,650,112 | 8/1953 | Kinkead | 285/47 |
| 2,872,947 | 2/1959 | Isenberg | 138/149 X |
| 2,894,537 | 7/1959 | Carr | 285/47 X |
| 3,199,417 | 8/1965 | Young et al. | 55/525 X |
| 3,381,774 | 5/1968 | Stode et al. | 55/529 |
| 3,602,630 | 8/1971 | Sassin | 138/114 |
| 3,653,665 | 9/1972 | Veerling et al. | 138/149 |
| 4,063,755 | 12/1977 | Merz | 138/149 X |
| 4,124,040 | 11/1978 | Miller | 138/149 X |

FOREIGN PATENT DOCUMENTS

| | | | |
|---|---|---|---|
| 200163 | 12/1955 | Australia | 138/149 |
| 256636 | 8/1948 | Switzerland | 138/149 |

*Primary Examiner*—Richard E. Aegerter
*Assistant Examiner*—James E. Bryant, III
*Attorney, Agent, or Firm*—Huebner & Worrel

[57] ABSTRACT

In a very high or very low temperature duct system in which duct insulation is terminated at selected locations so as to be not coextensive with the duct, an annular metal perforated or mesh screen support flange is used, as a low conductor of heat or cold, between the duct and an outer insulation cover to retain the end of the insulation and to support its usually very thin cover. The screen may be Z-shaped in cross section having a small diameter annular portion to surround and be secured to the duct adjacent the end of the insulation. A generally radially extending portion of the screen extends outwardly from the small diameter portion and adjacent the end of the insulation. The periphery of the radially extending portion is in alignment with the outer peripheral surface of the insulation and the outer peripheral surface of the insulation cover. A large diameter annular portion of the screen extends longitudinally from the periphery in the direction opposite the small diameter portion, and is adapted to surround the insulation and its cover and be secured thereto.

The screen may also be U or channel-shaped with one longitudinally directed leg secured to the insulation cover and the other leg secured to the duct under the insulation.

The invention described herein was made in the performance of work under NASA Contract No. NAS 9-14000 and is subject to the provisions of Section 305 of the National Aeronautics and Space Act 1958 (72 STAT 435; 42 U.S.C. 2457).

18 Claims, 7 Drawing Figures

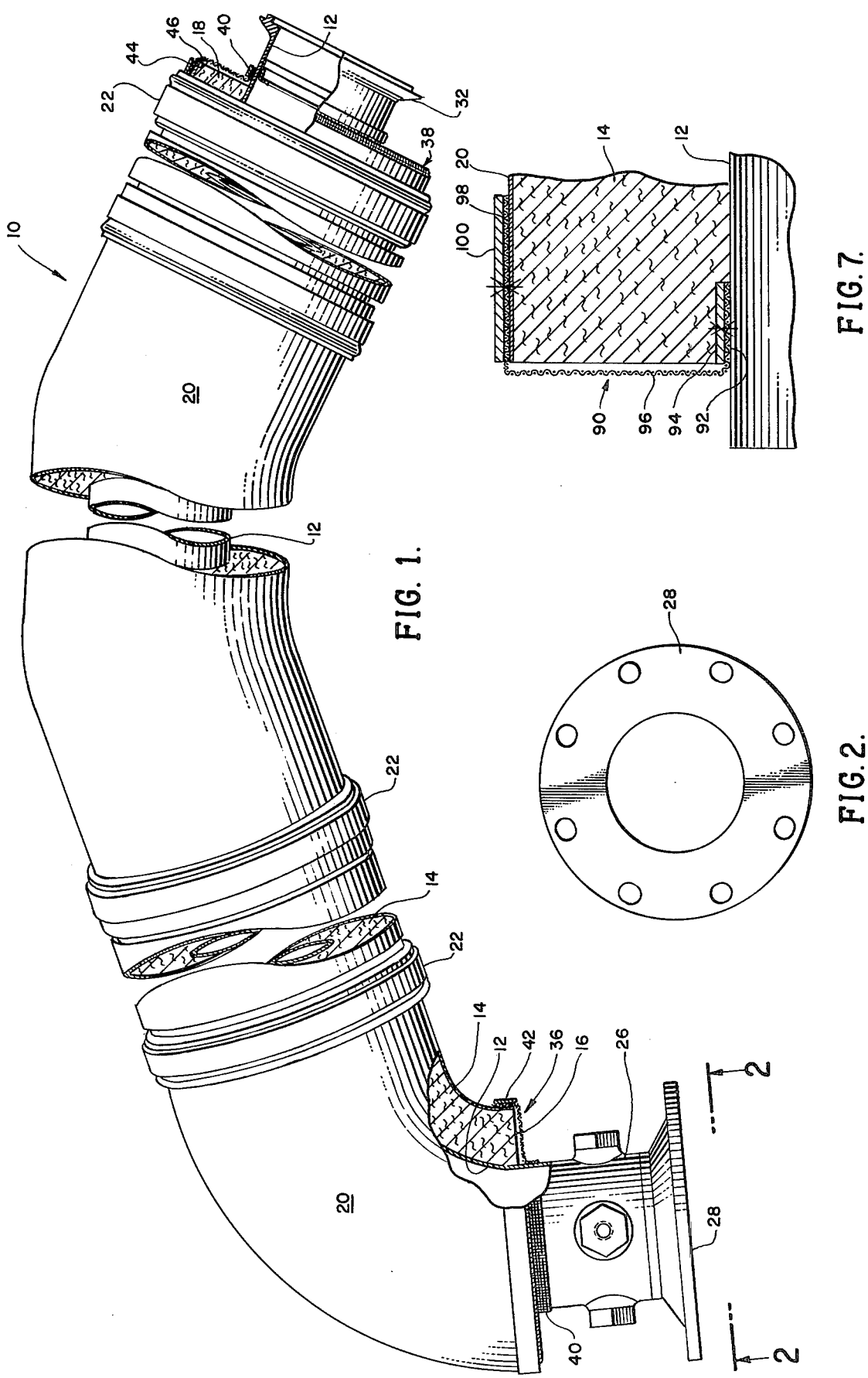

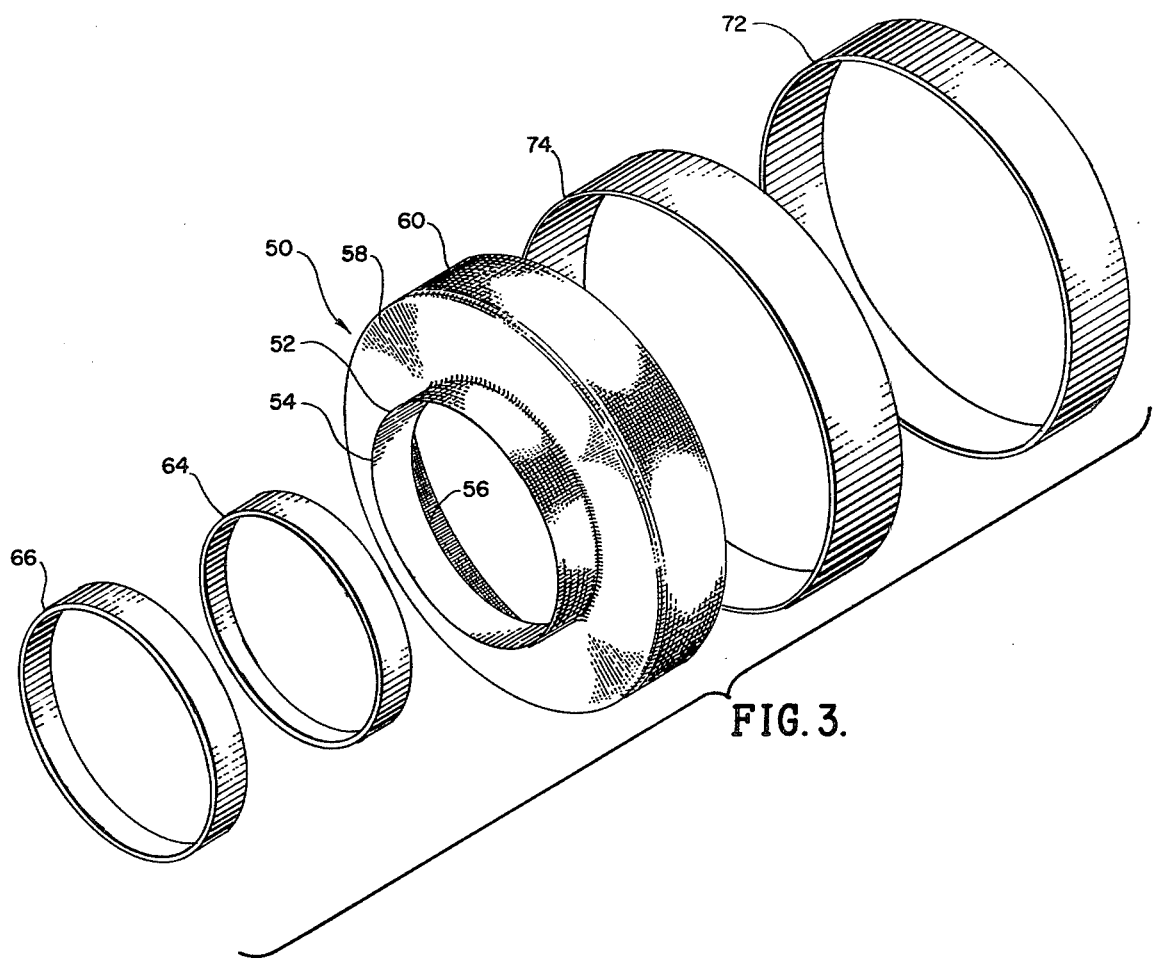
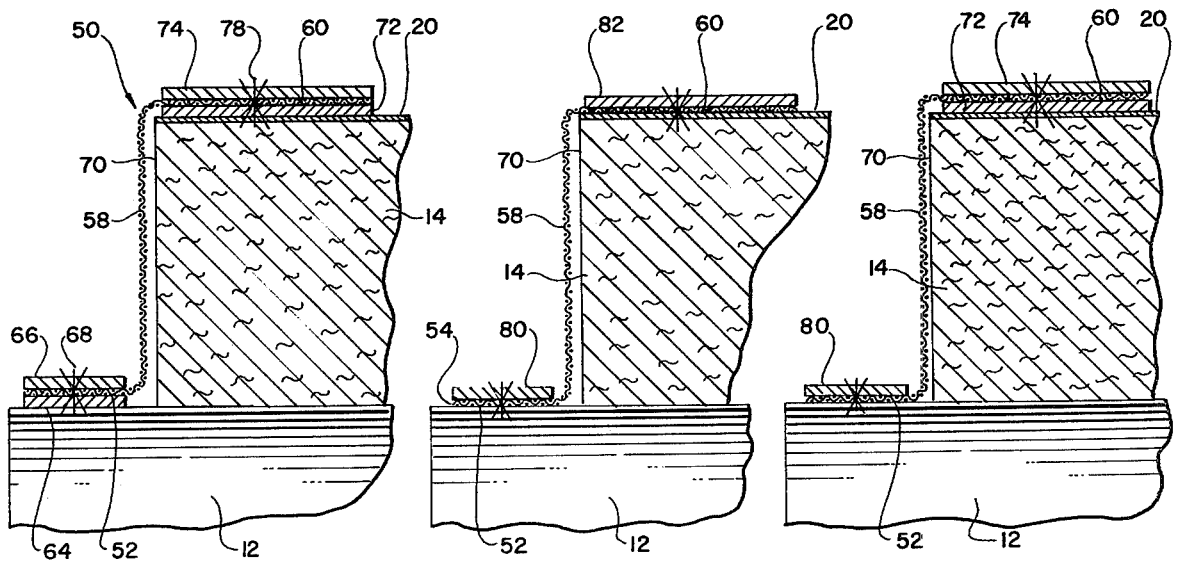

LOW CONDUCTING METAL SCREEN SUPPORT FLANGE

BACKGROUND OF THE INVENTION

Typically there are ducts carrying high temperature exhausts or other fluids extending into aircraft chambers which contain combustible materials. The ducts are insulated to prevent the heat of the fluid being carried from being transmitted into the chamber. In many instances it is necessary to terminate the insulation within such a chamber because of a change in the shape of the duct or because of a fitting which requires a different shape of insulation therearound. Where the insulation is terminated, it is necessary to retain it between the duct and the outer portion thereof which generally is covered with a very thin metal shell.

While these problems may occur with very low temperatures, the typical situation is with high temperatures. For example, in a typical duct in an aircraft the temperature of the fluid passing therethrough could be about 1000° F. or 1100° F. and the ambient temperature in the chamber could be about 225° F. It also may vary down to minus 150° F.

Where prior art metal flanges were secured to retain the end of the insulation and to support its cover outwardly of the duct, hot spots developed in the flanges, and where they extend over the insulation cover. For example, a solid metal flange raises the temperature along the flange at the exterior of the cover to about 550° F. where the temperature in the duct is about 1025° F. and the ambient temperature is 225° F. This high temperature on the exterior of the insulation cover cannot be tolerated because of the combustible materials within the chamber. With the present invention under the same conditions, the temperature of the insulation cover at its end is raised only to 360° F. with a 57% weight reduction in the flange.

In the prior art there are low conducting plastics, but they cannot stand the heat in the conditions under consideration. Similarly, ceramics could be used, but they are too heavy.

SUMMARY OF THE INVENTION

The present invention is a low conducting metal perforated or mesh screen support flange which is secured to the hot duct at the end of the insulation and which extends outwardly along the end of the insulation to retain it, and has a flange portion at its outer end secured on the insulation cover, to provide complete support between the duct and the cover. The screen conducts a minimum of heat from the hot duct to the exterior of the insulation cover and is a very simple and lightweight structure that adequately supports the insulation and its cover.

Accordingly, it is an object of the invention to provide an improved low conducting insulation cover support means where the insulation must be terminated at a selected location on a duct carrying very high or very low temperature fluids.

It is another object of the invention to provide a support between a duct and its insulation cover extending along the terminated insulation end, as described in the preceding paragraph, in the form of a generally Z-shaped flange made of a lightweight metal perforated or mesh screen, whereby the flange has two longitudinal annular portions extending in opposite directions from a radial portion, one of which may be secured to the circumference of the duct and the other secured to the circumference of the insulation cover.

It is still another object of the invention to provide a support between a duct and its insulation cover, as described in the preceding paragraphs, in the form of a U or channel-shaped flange, whereby the flange has two longitudinal portions extending in the same direction, one externally of the cover and one internally of the insulation.

The method of securing the flanges is by the use of thin bands extending around the screen and duct and around the screen and insulation cover. One band at each location may be sufficient in certain circumstances, and under other conditions two bands may be used, one between the screen and the duct and one between the insulation cover and the screen, and a second band in each location externally of the screen.

It is a further object of the invention to provide a screen support flange, as described in previous paragraphs, which has a low conductability and which will keep the "touch temperature" of an insulation shell down to acceptable limits.

Further objects and advantages of the invention may be brought out in the following part of the specification wherein small details have been described for the competence of disclosure, without intending to limit the scope of the invention which is set forth in the appended claims.

BRIEF DESCRIPTION OF THE DRAWINGS

Referring to the accompanying drawings, which are for illustrative purposes:

FIG. 1 is a cutaway view of an insulated duct as may be used for carrying high temperature fluids within an aircraft, and on which screen support flanges, according to the invention, are employed at two insulation ends;

FIG. 2 is an end view of a duct securing flange, taken along the line 2—2 in FIG. 1;

FIG. 3 is an exploded view of a screen support flange and two sets of rings for securing the flange to the duct and insulation cover;

FIG. 4 is a cross-sectional fragmentary view of an insulated duct, illustrating the employment of a screen support flange, secured to both the duct and the insulation cover by two bands;

FIG. 5 is a view similar to FIG. 4, except that only one band is used to secure the screen to the duct and the insulation cover;

FIG. 6 is a view of another variation of the structure in FIG. 4 in which one band is used to secure the screen to the duct and two bands are used to secure the screen to the insulation cover; and FIG. 7 is a cross-sectional fragmentary view of another embodiment of the invention in which the securing flange is channel-shaped in cross section.

DESCRIPTION OF THE PREFERRED EMBODIMENTS

Referring again to the drawings, there is shown in FIG. 1 a high or low temperature insulated duct, generally designated as 10. Surrounding an annular duct 12 is annular insulation 14 which terminates at ends 16 and 18 so as to not be coextensive with the duct. To hold the insulation around the duct there is a thin annular shell or tube 20. The tube is shown to be interrupted and connected by joining members 22.

The insulation is terminated at 16 and 18 because of different insulation fitting requirements extending longitudinally outwardly thereof. Outwardly of the end 16 is an irregular shaped fitting 26 having a connecting flange 28, shown in end view in FIG. 2. Similarly, at the insulation end 18, different shaped insulation is required over the flange end 32 on the tube. In operation, it is necessary that the parts 26 and 32 be insulated but the insulation is not shown because it is not pertinent to the present invention.

In the embodiment shown, the insulation shell 20 is stainless steel Cres 321 having a thickness of 0.002" and is made only thick enough to retain the insulation in place. The insulation may be Fiberglas or Johns-Manville Microfibers Felt, for example. The duct 12 is designed to carry gases or liquids having pressures of from 8 to approximately 12 pounds per square inch at about 1080° F. The ambient temperature range is from minus 150° F. to plus 225° F. The duct 12 is made of stainless steel alloy 600 and has a thickness of 0.018".

At each of the ends 16 and 18 of the insulation there is a perforated or mesh screen support flange, generally designated as 36 and 38, respectively. These flanges provide support between the duct 12 and the insulation cover 20, holding the insulation and cover in position. The flange 36 is secured on the duct by a thin band 40 and secured on the tube 20 by another thin band 42. The flange 38 is secured on the duct by a band 40 and secured on the tube by two bands 44 and 46, the band 46 being fitted snugly on the tube and the band 44 being fitted on the exterior circumference of the screen.

In FIGS. 3-6 the bands and screen are shown in detail. Here, the generally Z-shaped screen support flange 50 has an annular small diameter portion 52 adapted to be secured on a duct, as 12. The small diameter portion has an outer end 54 extending away from the insulation and has an inner end 56 to be positioned adjacent the insulation. Extending radially outwardly from the inner end 56 of the small diameter portion is a disk-shaped portion 58, having a circumference adapted to be in alignment with the insulation cover 20. An annular large diameter portion 60 extends from the circumference of the disk portion to extend over the insulation cover or over a securing band.

The members shown in the exploded view in FIG. 3 are illustrated in their supporting position in FIG. 4. Here, the small diameter portion has an inner band 64 snugly fitted on the duct 12 with the small diameter portion of the screen fitted thereon. Surrounding the small diameter portion is a second band 66 and the two bands and the screen are welded to the duct, as shown at 68.

The disk-shaped portion 58 of the screen is shown closely adjacent an end 70 of the annular insulation. Fitted on the thin tube 20 is an inner band 72 over which the screen extends. The second band 74 is fitted snugly on the screen and the bands and screen are welded to the tube 20 as at 78.

This structural arrangement retains the insulation in place and supports the tube 20 adjacent the ends of the insulation. The screen used is 20 mesh and being made of stainless steel wire having a diameter of 0.016". The mesh may vary between 6 and 200. The small bands on the duct are about 0.35" wide and are made of stainless steel Cres 321, having a thickness of 0.016". The wider bands on the tube 20 are of the same thickness and material and are about 1" in width. The difference between the outer diameters of the bands 64 and 72 and the respective inner diameters of the bands 66 and 74 is just great enough to slip the screen therebetween, the screen being under a slight compression.

An alternate embodiment is shown in FIG. 5 where only one band 80 secures the small diameter portion 52 on the duct and one band 82 secures the large diameter portion of the screen on the tube 20. These bands and screen portions are also welded to the duct and tube.

In FIG. 6 a third embodiment is shown where one band 80 secures the small diameter portion 52 to the duct and two bands 72 and 74, as in FIG. 4, secure the large diameter portion to the tube 20.

In FIG. 7, the channel-shaped form of the invention is illustrated. Here, the U-shaped screen 90 has a longitudinally short, inner annular leg 92 secured to the duct 12 by a welded band 94, the band and leg 92 being under the insulation 14. A radial portion 96 of the screen extends from the leg 92 to retain the insulation and terminates in a longer outer annular leg 98 to support the tube 20, the leg 98 being secured to the duct by the welded band 100. The insulation may be generally slipped into the screen after it is secured to the duct. Multiple securing bands may be used to secure the screen to the duct, as practical, and illustrated in FIGS. 4 and 6.

Because of the necessary interruptions in the insulation, where the insulation must be retained and the tube 20 must be supported by some means, such as flanges 36 and 38 in FIG. 1 or flange 90 in FIG. 7, heat tends to flow through the retaining and supporting means along its radial surface at the end of the insulation and to the surface of the tube 20. As indicated, the present invention reduces the 550° F. prior art temperature of the tube to 360° F. This temperature is low enough not to cause a combustion problem within the chamber. Thus, it has been found that the screen has a very low conductivity and at the same time is adequate to retain the insulation and support the cover tube 20 with a substantial weight reduction over existing prior art collars and flanges used for the same purpose.

The invention and its attendant advantages will be understood from the foregoing description and it will be apparent that various changes may be made in the form, construction and arrangements of the parts of the invention without departing from the spirit and scope thereof or sacrificing its material advantages, the arrangements hereinbefore described being merely by way of example. We do not wish to be restricted to the specific forms shown or uses mentioned except as defined in the accompanying claims, wherein various portions have been separated for clarity of reading and not for emphasis.

We claim:

1. For use as a conductor of minimum amounts of heat or cold at ends of insulation on an annular duct carrying very high or very low temperature fluid, a mesh metal screen support flange comprising:

a small diameter generally cylindrical portion of said mesh screen support flange adapted to surround and be secured to a part of the duct adjacent an end of the insulation, said small diameter portion having an end adapted to be adjacent the insulation, a radial plane portion of said screen extending from and being generally perpendicular to the axis of said small diameter portion and adapted to extend adjacent said end of the insulation, and a large diameter generally cylindrical portion of said screen extending from the periphery of the radial portion, said large diameter portion extending so as to be adapted to surround said insulation adjacent its end on said duct and being adapted to be secured around said insulation.

2. The invention according to claim 1 in which:

said flange has a first annular band surrounding and secured to said small diameter portion to secure it to said duct, and said flange has a second annular band surrounding and secured to said large diameter portion to secure it around said insulation.

3. The invention according to claim 1 in which:

said flange has a first inner band being adapted to surround said duct adjacent the end of said insulation and being inwardly of and secured to said small diameter portion, a first outer band surrounding and secured to said small diameter portion and to said first inner band and being adapted to secure said small diameter portion to said duct, said first inner band being adapted to fit snugly on said duct and having an outer diameter slightly smaller than the inner diameter of said first outer band, a second inner band being adapted to surround a thin annular tube surrounding said insulation, said second inner band being fitted inwardly of and secured to said large diameter portion, a second outer band surrounding and secured to said large diameter portion and to said second inner band and being adapted to secure said large diameter portion to and to said thin annular tube, said second inner band being adapted to fit snugly on said thin annular tube and having an outer diameter slightly smaller than the inner diameter of said second outer band.

4. The invention according to claim 3 in which:

said first bands are adapted to be welded to said duct, and are welded to said small diameter portion and to each other, said second bands are adapted to be welded to said thin tube, and are welded to said large diameter portion and to each other.

5. The invention according to claim 1 in which:

said screen is 20 mesh, the screen wire being 0.016" in diameter.

6. The invention according to claim 1 in which:

the mesh of said screen may be in the range of 6 to 200.

7. The invention according to claim 1 in which:

said large diameter annular portion extends in the direction away from said small diameter portion.

8. The invention according to claim 1 in which:

said small diameter portion and said large diameter extend in the same direction to form an annular channel-shaped support flange.

9. In a very high or very low temperature ducting system in which the duct insulating material has at least one end so as not to be extensive with the duct and the end must be supported with means that conducts a minimum of heat or cold from the duct to the exterior of the insulating material, an annular duct for transmitting high or low temperature fluids, generally annular low heat transfer insulating material surrounding said duct and terminating at a selected end on said duct, said insulating material at said end having a face outwardly extending generally transversely from the duct, said insulating material being surrounded by an annular retaining tube to hold it on the duct, said tube terminating at an end adjacent said transverse insulating material face, the improvement comprising:

metal means secured to said duct and said tube adjacent said insulating material and tube ends to retain said transverse insulating material face in place, and to support said tube on said duct, said metal means being adapted to conduct only a minimum of heat or cold from said duct along said insulating material face and generally radially outwardly therefrom to avoid a hot spot or cold spot, respectively, in the area of said face and adjacent the tube end, and to permit only a minimum temperature change outwardly of said duct.

10. The invention according to claim 9 in which:

said means is a mesh screen formed as an annular generally Z-shaped flange.

11. The invention according to claim 9 in which:

said means is a mesh screen formed as an annular channel-shaped flange.

12. The invention according to claim 9 in which:

said means is a mesh screen formed as a flange, said screen having a small diameter annular portion surrounding said duct, said last portion having an end adjacent said insulation face, a disk-shaped portion of said screen extending generally radially from said end along said insulation face and having its circumference in general alignment with the outer surface of said tube, and a large diameter annular portion of said screen extending from the circumference of the disk portion, said large diameter portion snugly surrounding said tube adjacent its end.

13. The invention according to claim 12 including:

a first annular band snugly surrounding said small diameter portion and securing it on said duct, a second annular band snugly surrounding said large diameter portion and securing it on said tube.

14. The invention according to claim 12 including:

a first inner band snugly fitted on said duct and being surrounded by said small diameter portion, a first outer band snugly fitted on said small diameter portion and surrounding said first inner band to secure said small diameter portion on said duct, said first inner band having an outer diameter slightly smaller than the inner diameter of said first outer band, a second inner band snugly fitted on said tube, and being surrounded by said large diameter portion, and a second outer band snugly fitted on said large diameter portion and surrounding said second inner band to secure said large diameter portion on said tube, said second inner band having an outer diameter slightly smaller than the inner diameter of said second outer band.

15. The invention according to claim 14 in which:

said first bands are welded to said duct, to said smaller diameter portion, and to each other, said second bands are welded to said tube, to said large diameter portion, and to each other.

16. The invention according to claim 9 in which:

said metal means is a 20 mesh screen, the screen wire being 0.016" in diameter.

17. The invention according to claim 9 in which:
said metal means is a screen having a mesh in the range from 6 to 200.

18. The invention according to claim 9 in which:
said metal means is a screen having a multiplicity of perforations provided to eliminate heat or cold conducting metal therefrom.

* * * * *